United States Patent [19]

La Passo et al.

[11] 4,311,049
[45] Jan. 19, 1982

[54] THERMOMETER

[75] Inventors: Leonard J. La Passo; Harry Benoit, both of Rockford, Ill.

[73] Assignee: Motion Control, Inc., Rockford, Ill.

[21] Appl. No.: 142,338

[22] Filed: Apr. 21, 1980

[51] Int. Cl.³ .............................................. G01K 5/62
[52] U.S. Cl. .................................. 73/362.4; 73/363.9
[58] Field of Search ................ 73/362.7, 362.4, 362.5, 73/739, 363.5, 363.7, 363.9, 368.6

[56] References Cited

U.S. PATENT DOCUMENTS

| | | | |
|---|---|---|---|
| 1,933,801 | 11/1933 | Hart | 73/118 |
| 2,266,277 | 12/1941 | Seegers et al. | 73/367 |
| 2,415,412 | 2/1947 | Buchwald et al. | 49/81 |
| 2,516,930 | 8/1950 | Varian | 29/25.18 |
| 2,628,417 | 2/1953 | Peyches | 29/148 |
| 2,718,778 | 9/1955 | Koch et al. | 73/1 |
| 3,267,734 | 8/1966 | Marks | 73/739 |
| 3,279,029 | 10/1966 | Stern et al. | 29/25.16 |
| 3,338,499 | 8/1967 | Gilbert | 228/57 |
| 3,348,617 | 10/1967 | Macartney | 169/42 |
| 3,387,495 | 6/1968 | Himstedt | 73/739 |
| 3,536,139 | 10/1970 | Berti | 169/26 |
| 3,648,350 | 3/1972 | Cassidy | 29/423 |
| 3,776,041 | 12/1973 | Wetterhorn | 73/739 |
| 3,842,675 | 10/1974 | Hunt | 73/363.9 |
| 4,078,294 | 3/1978 | Maire | 29/428 |
| 4,175,444 | 11/1979 | Harland | 73/738 |
| 4,211,114 | 7/1980 | Hood | 73/363.9 |

FOREIGN PATENT DOCUMENTS 277906  10/1927  United Kingdom ............... 73/363.9

*Primary Examiner*—Donald O. Woodiel
*Attorney, Agent, or Firm*—Hosier, Niro & Daleiden

[57] ABSTRACT

A thermometer is disclosed comprising a housing with a lens member and a sensing sleeve extending from the lens member. The lens member is configured to define an enclosed chamber in which a temperature indicating means is disposed. The temperature indicating means is attached to a shaft which extends into the sensing sleeve. A temperature responsive element is mounted within the sleeve and operatively associated with the shaft to rotate shaft and indicating means in response to changes in temperature. Means for constraining mechanically induced rotation of the shaft and indicator means to a predetermined arc of angular displacement are provided. In an important aspect of the invention, the constraining means permit temperature induced rotation of the shaft and the indicator means to exceed the pre-determined arc of angular displacement. The constraining means utilized include fusible stop arrangements and the introduction of a dampening fluid to the enclosed chamber of the thermometer housing.

13 Claims, 6 Drawing Figures

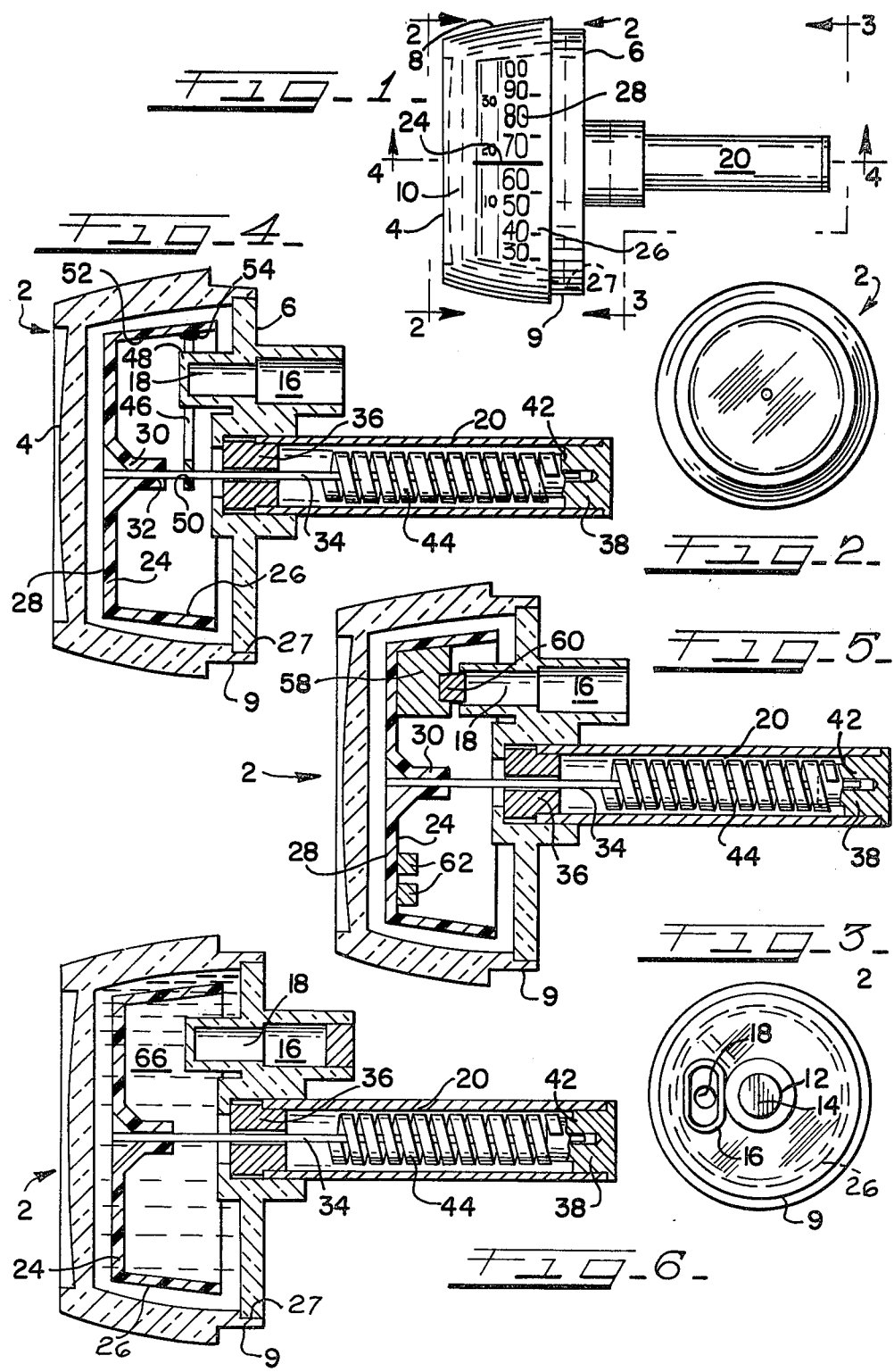

THERMOMETER

BACKGROUND OF THE INVENTION

The present invention relates generally to thermometers and more particularly thermometers designed to withstand mechanical abuse and excessive temperatures which might otherwise cause damaging stress. The present invention is particularly useful in connection with the protection of thermometers utilizing bimetallic temperature responsive elements and rotating temperature indicators.

It is well recognized that thermometers, including particularly thermometers utilizing bimetallic temperature responsive elements, are very fragile devices, subject to damage from rough handling and excessive vibration. While the fragility of these thermometers is well known, economic and other considerations often require that they be used in applications from which rough handling and vibration cannot be entirely eliminated. In the automobile industry, for example, dial thermometers having bimetallic temperature responsive elements and rotary temperature indicators are mounted in exterior rear view mirrors of luxury cars. Unfortunately, abuse by production workers on the automotive assembly line can result in the mounting of miscalibrated or broken thermometers.

Since the damage of such dial thermometers generally results from uncontrolled rotary oscillation of the thermometer indicator and attached components, one solution employed to reduce this mechanically induced damage has been to provide a mechanical stop which limits oscillatory movement of the indicator beyond a pre-determined point. This remedy, however, has been found to introduce equally undesirable temperature induced damage when the thermometer must be subjected to extreme temperatures.

Efficient automobile production requires that externally mounted thermometers be attached prior to touch up of the automobile exterior. Thus, an automobile with thermometer in place is moved through a touch up oven which generally is maintained at temperatures in excess of 200° F. As the bimetallic element of the thermometer responds to the temperature of the touch up oven and rotates the dial, the indicator stop will engage while the bimetallic element continues to apply an increasing torque. This torque can reach levels sufficient to break weldments between the bimetallic element and the shaft supporting the indicator. Even where weldments are not broken, these torque stresses are likely to permanently distort the temperature responsive element of to displace the shaft between the bimetallic element and the dial from its mounting in the dial, thereby destroying thermometer calibration.

SUMMARY OF THE INVENTION

The present invention is directed to a thermometer protected from damage caused by mechanically introduced and temperature induced stresses. Thus, the thermometer of the present invention overcomes the disadvantages attendent to prior art devices of this kind.

In accordance with the invention, a thermometer is provided having a housing including a lens member and a sensing sleeve extending from the lens member. The lens member is configured to define an enclosed chamber to hold a temperature indicating means which is visible through the lens member. The sensing sleeve may be an elongated tubular stem adapted for insertion into a corresponding opening in a mounting structure to indicate the temperature of the environment of the mounting structure. A temperature indicating means is disposed within the lens chamber and mounted to a shaft which extends into the sensing sleeve. The shaft and attached indicating means are freely rotatable and may also move longitudinally. The temperature indicating means may have a calibrated scale positioned for movement relative to a pointer on the lens by which temperature readings may be made. Alternatively, the indicating means may carry the pointer and the lens the calibrated scale. A temperature responsive element is mounted within the sleeve and operatively associated with the shaft. This element rotates the shaft and attached indicating means in response to changes in temperature in the environment surrounding the sleeve. While various well known temperature responsive elements may be employed, bimetallic temperature responsive strips are preferred and elongated helically wound bimetallic temperature responsive strips are especially preferred. Finally, means are provided for constraining mechanically induced rotation of the shaft and attached indicator means to a pre-determined arc of angular displacement while permitting temperature induced rotation to exceed that pre-determined arc. A number of alternative constraining means are included in the teaching of the present invention.

The constraining means may comprise a fluid disposed within the housing to dampen mechanically induced movement of the shaft and the indicating means, thereby preventing excessive accurate displacement of the indicator. A properly chosen fluid will prevent damage to thermometer components without interfering with temperature induced movement of the indicating means.

Another useful constraining means falling within the teaching of the present invention comprises a stop formed of a fusible material which melts at a pre-determined critical temperature. This stop is positioned within the thermometer housing to limit mechanically induced rotational movement of the indicating means while the temperature of the environment is below a critical temperature level. If the temperature of the environment rises above the critical temperature, the stop will melt, permitting unimpeded movement of the indicator means and preventing the build up of potentially damaging stress between thermometer components.

One useful fusible stop arrangement employs a fusible member, which is affixed to the housing, and an abutment element, which is positioned on the indicating means. The fusible member and the abutment element are dimensioned and positioned to engage as the shaft and indicating means rotate to the end of the pre-determined arc. When the critical temperature is exceeded, the fusible member will melt thereby permitting rotation of the indicating means beyond the end of the pre-determined arc.

In yet another embodiment of the present invention, the constraining means is a non-fusible bar fusibly affixed to the indicating means and positioned for engagement with an abutment element on the housing when the indicating means rotates through the full range of the pre-determined arc. Once again, when the critical temperature is exceeded, the fusible affixment will melt thereby permitting rotation of the indicating means beyond the end of the pre-determined arc.

It is therefore, an object of the present invention to provide a thermometer protected from mechanically induced damage by controlling the movement of the thermometer indicator.

Another important object of the present invention is to provide a thermometer protected from mechanically induced damage, which will not be harmed by torque stresses resulting from exposure of the thermometer to excessive temperatures.

It is yet another object of the present invention to provide a simplified dial thermometer structure which is protected from both mechanically induced and temperature induced damage.

Other objects and features of the invention will become apparent upon examination of the following specification and drawings, together with the claims. While the invention is described below in connection with preferred or illustrative embodiments, these embodiments are not intended to be exhaustive or limiting of the invention. Rather, the invention is intended to cover any alternatives, modifications and equivalents that may be included within the spirit and scope of the invention as defined by the appended claims.

BRIEF DESCRIPTION OF THE DRAWINGS

The invention, together with further of its objects and attendant advantages, will best be understood by reference to the following description taken in connection with the accompanying drawings in which:

FIG. 1 is a side elevational view of the thermometer of the present invention;

FIG. 2 is an end elevational view of the thermometer of the present invention taken along line 2—2 of FIG. 1;

FIG. 3 is an end elevational view of the thermometer of the present invention taken along line 3—3 of FIG. 1;

FIGS. 4 and 5 are cross-sectional side elevational views of the present thermometer taken along line 4—4 of FIG. 1 showing different configurations of fusible constraining means;

FIG. 6 is a side elevational view of the present thermometer corresponding to that in FIGS. 4 and 5, in which constraining means comprising a fluid disposed within the thermometer housing is portrayed.

Similar reference numerals are applied to corresponding features throughout the different figures of the drawings.

DETAILED DESCRIPTION OF THE INVENTOR p Turning now to the drawings, externally visible details of thermometer 2 are illustrated in FIGS. 1–3. Thermometer 2 is shown comprising a housing with first and second end walls 4 and 6 and side wall 8 together defining a closed chamber 10.

End wall 6 has an axially positioned socket 12 with a central bore 14 communicating with the interior of closed chamber 10. Also positioned on end wall 6 is an LED or fibreoptic cell 16 including tubular LED or fibreoptic tower 18 in communication therewith. LED or fibreoptic cell 16 is dimensioned for receiving an LED or fibreoptic (not shown) in tower 18 to provide light for facilitating thermometer reading under low light conditions. End wall 6 further includes an annular lip 9 for insertion into a thermometer mounting cavity (not shown). Lip 9 may optionally include keyways (not shown) for positively orienting the lip within the mounting cavity. Finally, the thermometer housing includes a sensing sleeve in the form of elongated stem 20 which is fixed in socket 12 and extend longitudinally from end wall 6.

End walls 4 and 6 and side wall 8 are molded from clear polycarbonate or acrylic resins, although other materials and forming techniques may be employed. It is important that at least a portion of side wall 8 be transparent to permit the calibration of indicator 22 (described below) to be read against a pointer 24 applied to the inner or outer surface of side wall 8. Elongated stem 20 is formed from any convenient material with good thermal conductivity, such as aluminum or an aluminum alloy.

As presently illustrated, end wall 4 is integrally formed with side wall 8. End wall 6, on the other hand, is pressed into a closely fitting annular notch 27 and then affixed in place with cyanoacrylate glue or epoxy resins or by well known ultrasonic welding techniques. Elongated stem 20 may similarly be fixed in socket 16 with cyanoacrylate glue, epoxy resins or other adhesives.

Turning now to FIGS. 4–6, an indicator 24, disposed within chamber 10 is illustrated. Indicator 24 includes annular collar 26 with graduated dial portion 28 (FIG. 1) circumferentially disposed on its surface. Graduated dial portion 28 may be applied by various well known techniques such as silk screening or decalcomania. Indicator 24 further includes a forward face 28 with rearwardly extending longitudinal tower 30 and bore 32 for mounting to shaft 34.

Shaft 34 is disposed within elongated stem 20 and supported in bearings 36 and 38 for free rotational and longitudinal movement. Shaft 34 extends into chamber 10 and is fitted in bore 32 of indicator tower 30. While prior devices have required that an adhesive be used to firmly anchor similar thermometer indicators to their supporting shafts in order to resist rotational stresses set up between shaft and indicator, the present invention will help eliminate this requirement. In many cases, however, it may be necessary to use adhesive or, alternatively, to form barbs on the stem to bite into the walls of bore 32 to improve the grip between tower 30 and shaft 34.

Shaft 34 is made of a suitable material well known to those skilled in the art such as stainless steel, which resists sagging and bending. Bearings 36 and 38 are made of wellwearing materials compatible with shaft 34, and are press fit or adhesively secured within stem 20. An adhesive such as cyanoacrylate glue or epoxy resin may be used for this purpose.

A temperature responsive element in the form of elongated helically wound bimetallic temperature responsive strip 44 is mounted within stem 20. Strip 44 is attached at one end to annular neck 42 of bearing 38 and at its opposite end to shaft 34 by conventional means, such as spot welding. This strip winds and unwinds in response to temperature changes thereby rotating and longitudinally moving indicator 24 within chamber 10.

Following a preferred embodiment of the present invention, as illustrated in FIG. 4, means for mechanically constraining the rotation of indicator 24 are illustrated. The constraining means generally comprise a stop bar 46 and an abutment portion 48 of LED tower 18 which are configured and positioned for engagement at a pre-determined point in the arc of rotation of indicator 24. Stop bar 46 is rotatably mounted on shaft 34 through a loosely fitting bore 50 and extends radially therefrom to the inner face 52 of indicator shoulder 26 where it is frangibly fixed in place with a fusible adhesive 54.

Since stop bar 46 rotates with indicator 24, rotation of the indicator is constrained to an arc of angular displacement determined by the point at which stop bar 48 is fixed to inner face 52. The range of this pre-determined arc will be set to protect the thermometer components from damage and misalignment due to excessively wide arcs of rotary oscillation of the dial.

Stop bar 46 is affixed to the dial inner surface 52 with a fusible adhesive 54 which fuses at a pre-determined critical temperature. As the temperature in the environment surrounding the thermometer increases to the point where stop bar 46 engages abutment 48, a torque is set up between abutment 48 and the stop bar. This torque increases as the temperature increases and would likely damage thermometer components, but for the release provided by fusible adhesive 54 which permits stop bar 46 to break away at a critical temperature chosen to prevent such damage. Since stop bar 46 is loosely mounted on shaft 34, once released it will not interfere with the movement of thermometer components.

Stop bar 46 may be made of any generally rigid material which is capable of withstanding the range of temperatures within which the thermometer is designed to operate. A typical useful material is polycarbonate resin. In a further modification of this embodiment of the invention, the stop bar may be itself a fusible link which extends between shaft 34 and indicator inner face 52. This link could be rotatably attached to the shaft by forming a hook or an eyelet in the end of the link; it would be attached to the inner face 52 by similar means or with an adhesive. The fusible link would melt at the critical temperature provided by the stop bar arrangement to release built-up stresses in the manner just discussed.

Where the stop bar arrangement of FIG. 4 is employed, any adhesive material which fuses at the critical temperature would be acceptable for use as adhesive 54. Typical such materials include 3M's "JET MELT" adhesives and Bostik's polyester based adhesives which are sold for use in nip roll laminating. When the critical temperature is set at about 150°-160° F., 3M's JET MELT adhesive No. 3735 or 3765 has been found to be particularly effective. Other thermoplastic or fusible materials which melt at the chosen critical temperature may readily be selected by those skilled in the art.

In accordance with a further aspect of the present invention, another fusible stop arrangement is illustrated in FIG. 5. In this arrangement, the constraining means includes an abutment 58 formed in the back of dial 24 and positioned and dimensioned to engage a fusible slug 60 attached to the top of LED tower 18. Abutment 58 may be molded in the dial by conventional means or it may be attached thereto. A counterbalance 62 may also be molded or attached to the dial to insure its balanced movement. Fusible slug 60 is either adhered to the top of LED tower 18 or press fit into a cavity formed therein (not shown). Slug 60 may be made of commonly available fusible materials such as the solders utilized in fusible links employed in automatic fire doors and other fire protection devices.

The structure of FIG. 5 operates in a manner very similar to that of FIG. 4. That is, fusible stop 60 engages dial abutment 58 to block indicator rotational oscillation beyond a pre-determined arc of angular displacement. Fusible stop 60 remains in place as long as the temperature in the environment surrounding the thermometer is below the critical temperature. If the temperature exceeds this critical level, the fusible stop will melt thereby releasing built-up stress.

Turning now to the embodiment of FIG. 6, there is illustrated a thermometer with constraining means in the form of a fluid 66 disposed within closed chamber 10 and sensing sleeve 20. This fluid cushions and dampens movement of indicator 24 by creating friction between the fluid and the surface of the indicator thereby protecting thermometer components from damage due to mechanically induced rotary movement of the indicator beyond a pre-determined arc. This dampening effect may be enhanced by introducing paddles on the indicator to increase friction between the dial and the fluid. The fluid 66 has the additional advantage of diffusing light provided by an optional LED mounted in LED compartment 16 to more evenly light the thermometer under low light conditions.

The primary constraint in the choice of fluid 66 is that, over the temperature operation range of the thermometer, the fluid must not exhibit a viscosity so great that it would reduce the responsiveness of the indicator to an unacceptable level. Also, fluid 66 must not degrade significantly over the life of the thermometer and it must be compatible with all thermometer components. Typical fluids generally satisfying these requirements include silicone fluids and glycerine. Dow Corning No. 200 fluid which has a viscosity of 20 centistokes at room temperature has been found to be particularly useful in this application. However, other much less viscous materials such as ethyl alcohol, have also performed satisfactorily.

As can be seen from the above description, the present invention provides means for constraining mechanically induced rotation of thermometer components while protecting these components from thermally induced stresses. These new unique constraining means are readily incorporated in thermometers, do not interfere with thermometer accuracy or reliability, and represent an important contribution to the art.

What is claimed is:

1. A thermometer comprising:
   a housing including a lens member and a sensing sleeve extending from said lens member, said lens member being configured to define an enclosed chamber;
   a rotatable shaft disposed within said sensing sleeve and extending into said chamber;
   an indicator head for indicating temperature mounted on said shaft for rotation therewith, said indicator head being of substantial mass and substantially filling said chamber;
   a temperature responsive element mounted within said sleeve and operatively associated with said shaft to rotate said shaft and said indicator head in response to a change in temperature; and
   non-fluid, mechanical means within said chamber operatively associated with said indicator head for constraining mechanically induced rotation of said shaft and indicator head to a pre-determined arc of angular displacement while permitting temperature induced rotation of said shaft and said indicator head to exceed said predetermined arc of angular displacement.

2. A thermometer as set forth in claim 1 wherein said sensing sleeve comprises an elongated stem extending longitudinally from said chamber and said temperature responsive element is an elongated helically wound bimetallic temperature responsive strip.

3. A thermometer comprising:
a thermometer housing having first and second end walls and a side wall together defining a closed chamber, said first end wall having an axially positioned socket with a central bore communicating with the interior of said closed chamber and an elongated stem affixed in said socket and extending longitudinally from said frest end wall;
a rotatable shaft disposed within said stem and extending through said central bore and into said closed chamber;
a temperature indicator disposed in said closed chamber, said indicator comprising a cylindrical element having axially disposed mounting means securing said indicator to said shaft;
an elongated helically wound bimetallic temperature responsive element mounted within said stem and operatively associated with said shaft to rotate said shaft and said temperature indicator in response to a change in temperature; and
means for constraining mechanically induced oscillation of said shaft and temperature indicator to a pre-determined arc of angular displacement while permitting temperature induced rotation of said shaft and said temperature indicator to exceed said pre-determined arc of angular displacement, said constraining means comprising an abutment element on said first end wall directed into the interior of said closed chamber and a stop bar extending radially from said shaft and fusibly affixed to the periphery of said temperature indicator, said abutment element and said stop bar being positioned to engage as said shaft and said temperature indicator rotate to the end of said pre-determined arc, said fusible affixment being formed of a material which fuses at said critical temperature to permit rotational movement of said indicator means beyond said pre-determined arc when temperatures exceed said critical temperature.

4. A thermometer comprising:
a housing including a lens member and a sensing sleeve extending from said lens member, said lens member being configured to define an enclosed chamber;
a rotatable shaft disposed within said sensing sleeve and extending into said chamber;
means for indicating temperature mounted on said shaft, said temperature indicating means being disposed within said chamber and rotatable with said shaft;
a temperature responsive element mounted within said sleeve and operatively associated with said shaft to rotate said shaft and said indicating means in response to a change in temperature; and
means for constraining mechanically induced rotation of said shaft and indicator means to a pre-determined arc of angular displacement while permitting temperature induced rotation of said shaft and said indicator means to exceed said pre-determined arc of angular displacement, said constraining means comprising stop means for preventing mechanically induced rotational movement of said indicating means beyond said pre-determined arc at a temperature below a critical temperature, said stop means being formed of a material which fuses at said critical temperature to permit rotational movement of said indicator means beyond said pre-determined arc when temperatures exceed said critical temperature.

5. A thermometer as set forth in claim 4 wherein said stop means comprises a fusible slug affixed to said housing and an abutment element on said indicating means, said fusible slug and said abutment element being dimensioned and positioned to engage as said shaft and said indicating means rotate to the end of said pre-determined arc.

6. A thermometer as set forth in claim 4 wherein said stop means comprises a stop bar fusibly affixed to said indicating means and an abutment element on said housing, said bar and said abutment element being positioned to engage as said indicating means rotates through the full range of said pre-determined arc.

7. A thermometer comprising:
a thermometer housing having first and second end walls and a side wall together defining a closed chamber, said first end wall having an axially positioned socket with a central bore communicating with the interior of said closed chamber and a sensing sleeve affixed in said socket and extending longitudinally from said first end wall;
a rotatable shaft disposed within said sensing sleeve and extending through said central bore and into said closed chamber;
a temperature indicator disposed in said closed chamber, said indicator comprising a cylindrical head of substantial mass and substantially filling said chamber and having axially disposed mounting means securing said indicator head to said shaft;
a bimetallic temperature responsive element mounted within said sleeve and operatively associated with said shaft to rotate said shaft and said temperature indicator head in response to a change in temperature; and
non-fluid, mechanical means within said chamber operatively associated with said temperature indicator head for constraining mechanically induced rotation of said shaft and temperature indicator head to a predetermined arc of angular displacement while permitting temperature induced rotation of said shaft and said temperature indicator head to exceed said pre-determined arc of angular displacement.

8. A thermometer as set forth in claim 7 wherein said sensing sleeve comprises an elongated stem extending longitudinally from said chamber and said temperature responsive element is an elongated helically wound temperature responsive strip.

9. A thermometer comprising:
a thermometer housing having first and second end walls and a side wall together defining a closed chamber, said first end wall having an axially positioned socket with a central bore communicating with the interior of said closed chamber and a sensing sleeve affixed in said socket and extending longitudinally from said first end wall;
a rotatable shaft disposed within said sensing sleeve and extending through said central bore and into said closed chamber;
a temperature indicator disposed in said closed chamber, said indicator comprising a cylindrical element having axially disposed mounting means securing said indicator to said shaft;
a bimetallic temperature responsive element mounted within said sleeve and operatively associated with said shaft to rotate said shaft and said temperature indicator in response to a change in temperature; and means for constraining mechanically induced rotation of said shaft and temperature indicator to a pre-determined arc of angular displacement while permitting temperature induced rotation of said shaft and said temperature indicator to exceed said pre-determined arc of angular displacement, said constraining means comprising stop means for preventing mechanically induced movement of said shaft and said indicator beyond said pre-determined arc at a temperature below a critical temperature, said stop means being formed of a material which fuses at said critical temperature to permit rotational movement of said indicator means beyond said pre-determined arc when temperatures exceed said critical temperature.

10. A thermometer as set forth in claim 9 wherein said stop means comprises an abutment element on said first end wall directed into the interior of said closed chamber and a fusible member extending radially from said shaft to the periphery of said temperature indicator, said abutment element and said fusible member being positioned to engage as said shaft and said temperature indicator rotate to the end of said pre-determined arc.

11. A thermometer as set forth in claim 9 wherein said fusible member comprises a stop bar fusibly affixed to the periphery of said temperature indicator.

12. An improved thermometer of the type having a thermometer housing with first and second end walls and a side wall together defining a closed chamber, the first end wall having an axially positioned socket with a central bore communicating with the interior of said closed chamber and a sensing sleeve affixed in said socket and extending longitudinally from the first end wall, a rotatable shaft disposed within the sensing sleeve and extending through the central bore and into the closed chamber, a temperature indicator disposed in the closed chamber, the indicator comprising a cylindrical element having axially disposed mounting means securing the indicator to the shaft, a bimetallic temperature responsive element mounted within the sleeve and operatively associated with the shaft to rotate the shaft and the temperature indicator in response to a change in temperature, wherein the improvement comprises:

non-fluid, mechanical means within said chamber operatively associated with said temperature indicator for constraining mechanically induced rotation of the shaft and temperature indicator to a pre-determined arc of angular displacement while permitting temperature induced rotation of said shaft and said temperature indicator to exceed the pre-determined arc of angular displacement.

13. In a thermometer which includes a housing having a lens member and defining an enclosed chamber, a sensing sleeve extending from said chamber, a rotatable shaft disposed within said sensing sleeve and extending into said chamber, a temperature indicator disposed in said closed chamber for indicating temperature and mounted on said shaft for rotation therewith, and a temperature responsive element mounted within said sleeve and operatively associated with said shaft to rotate said shaft and said temperature indicator in response to a change in temperature, the improvement comprising:

non-fluid, mechanical means within said chamber operatively associated with said temperature indicator for constraining mechanically induced rotation of the shaft and temperature indicator to a pre-determined arc of angular displacement while permitting temperature induced rotation of said shaft and said temperature indicator to exceed the pre-determined arc of angular displacement.

* * * * *